US012241310B1

(12) United States Patent
Wilson

(10) Patent No.: US 12,241,310 B1
(45) Date of Patent: Mar. 4, 2025

(54) LADDER PLATFORM DEVICE

(71) Applicant: James Wilson, New Castle, DE (US)

(72) Inventor: James Wilson, New Castle, DE (US)

( * ) Notice: Subject to any disclaimer, the term of this patent is extended or adjusted under 35 U.S.C. 154(b) by 0 days.

(21) Appl. No.: 18/377,195

(22) Filed: Oct. 5, 2023

(51) Int. Cl.
*E06C 7/16* (2006.01)
*E06C 7/14* (2006.01)

(52) U.S. Cl.
CPC . *E06C 7/16* (2013.01); *E06C 7/14* (2013.01)

(58) Field of Classification Search
CPC .................................... E06C 7/16; E06C 7/14
USPC .......................................................... 248/238
See application file for complete search history.

(56) References Cited

U.S. PATENT DOCUMENTS 4,874,147 A * 10/1989 Ory .......................... E06C 7/14 248/223.41
5,052,581 A 10/1991 Christ
5,342,008 A * 8/1994 Kay .......................... E06C 7/14 248/210
5,727,649 A 3/1998 Buckley
5,941,344 A * 8/1999 Spadaro .................... E06C 7/14 248/210
6,334,509 B1 * 1/2002 Ryszkiewicz ............ B25H 3/00 248/210
6,401,862 B1 * 6/2002 Caron ....................... E06C 7/14 182/120
6,443,260 B1 9/2002 Katz
6,467,577 B1 * 10/2002 Charlebois, Jr. .......... E06C 7/14 248/210
7,000,876 B2 2/2006 Searcy
7,264,084 B1 * 9/2007 Switzer ..................... E06C 7/14 248/238
10,450,799 B2 * 10/2019 Lawler ...................... E06C 7/16
11,781,380 B1 * 10/2023 Victoriano ................ E06C 7/14 248/210
2002/0148684 A1 * 10/2002 Charlebois, Jr. .......... E06C 7/14 182/129
2004/0163891 A1 * 8/2004 Craig ........................ E06C 7/16 248/238
2006/0163003 A1 * 7/2006 Wigstrom, Sr. .......... E06C 7/14 182/129
2007/0012514 A1 * 1/2007 Groy ......................... E06C 7/14 182/129
2009/0071408 A1 * 3/2009 Wechsler ............. A01K 39/012 119/51.01
2012/0175329 A1 * 7/2012 Johnson .................... E06C 7/14 29/428
2018/0238113 A1 * 8/2018 Wulfekotte ............... E06C 7/16

FOREIGN PATENT DOCUMENTS

WO WO2009025652 2/2009

* cited by examiner

*Primary Examiner* — Muhammad Ijaz

(57) ABSTRACT

A ladder platform device for defining a work surface on a ladder includes a platform that has a central panel extending between a pair of outward panels. The central panel is positionable upon a topmost step of a ladder such that each of the pair of outward panels defines a work surface to support tools and other objects. Each of the pair of outward panels has a recess to retain the tools and other objects on the outward panels. A plurality of hooks is provided and each of the plurality of hooks is removably attachable to a respective one of the pair of outward panels to suspend a tool from the respective outward panel.

6 Claims, 5 Drawing Sheets

LADDER PLATFORM DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to ladder platform devices and more particularly pertains to a new ladder platform device for defining a work surface on a ladder. The device includes a platform that comprises a central panel extending between a pair of outward panels. The central panel is positionable on a topmost step of a ladder such that each of the outward panels defines the works surface. Each of the outward panels has a recess for retaining tools and objects on the outward panels and the device includes a plurality of hooks that are each attachable to a respective outward panel for suspending tools from the outward panels. The device includes a pair of elastomeric bands that are positionable around the central panel and the topmost step for retaining the platform on the ladder.

(2) Description of Related Art Including Information Disclosed Under 37 CFR 1.97 and 1.98

The prior art relates to ladder platform devices including a variety of tray devices that are structured to engage a step of a ladder to define a work surface for supporting tools and objects. In no instance does the prior art disclose a platform device that is mountable to a topmost step of a ladder that includes a pair of outward panels that defines a pair of work surfaces for supporting tools and objects and a plurality of hooks that are each attachable to a respective outward panel for suspending tools from the outward panels.

BRIEF SUMMARY OF THE INVENTION

An embodiment of the disclosure meets the needs presented above by generally comprising a platform that has a central panel extending between a pair of outward panels. The central panel is positionable upon a topmost step of a ladder such that each of the pair of outward panels defines a work surface to support tools and other objects. Each of the pair of outward panels has a recess to retain the tools and other objects on the outward panels. A plurality of hooks is provided and each of the plurality of hooks is removably attachable to a respective one of the pair of outward panels to suspend a tool from the respective outward panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
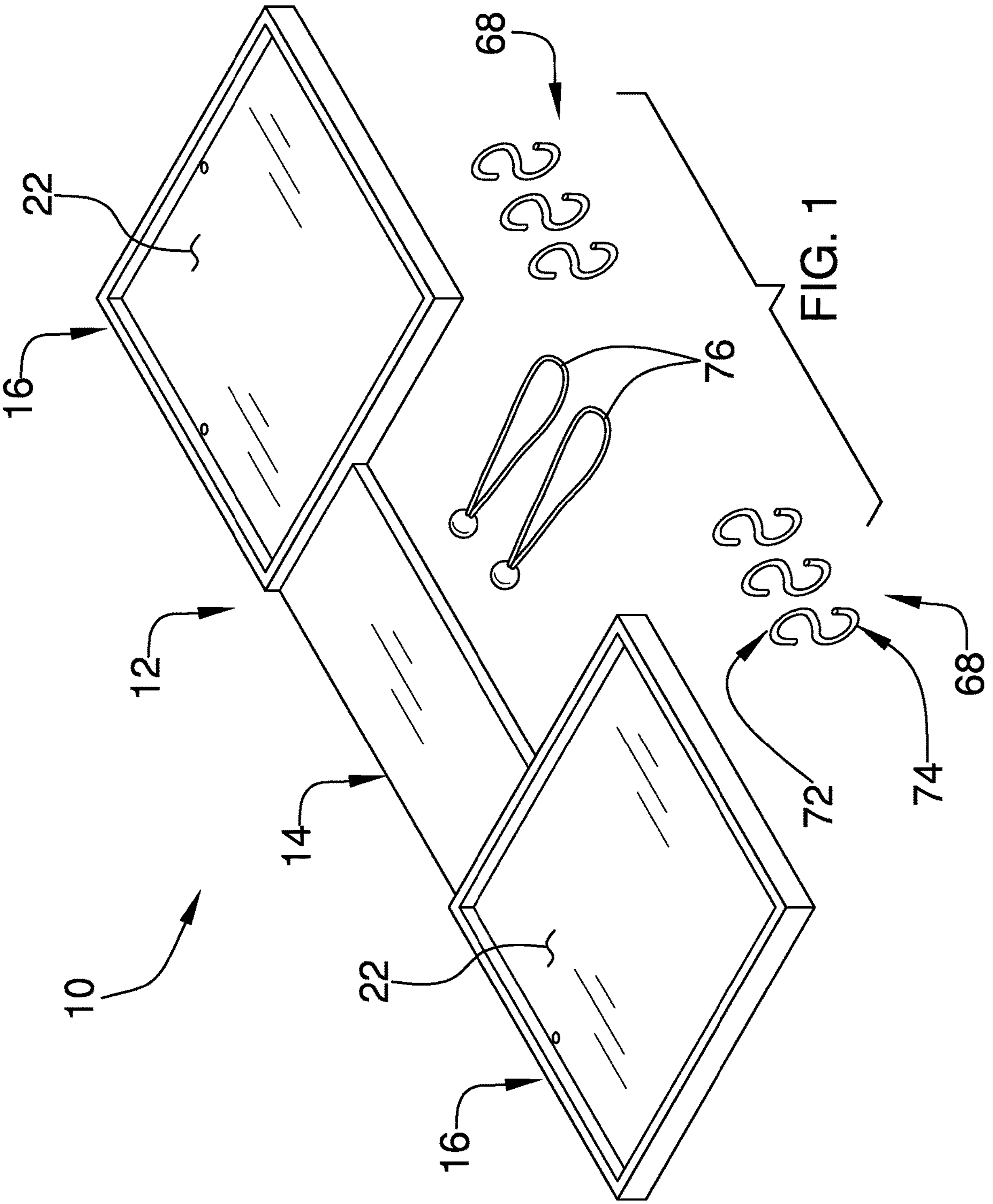
FIG. 1 is a top perspective view of a ladder platform device according to an embodiment of the disclosure.
Figure 2:
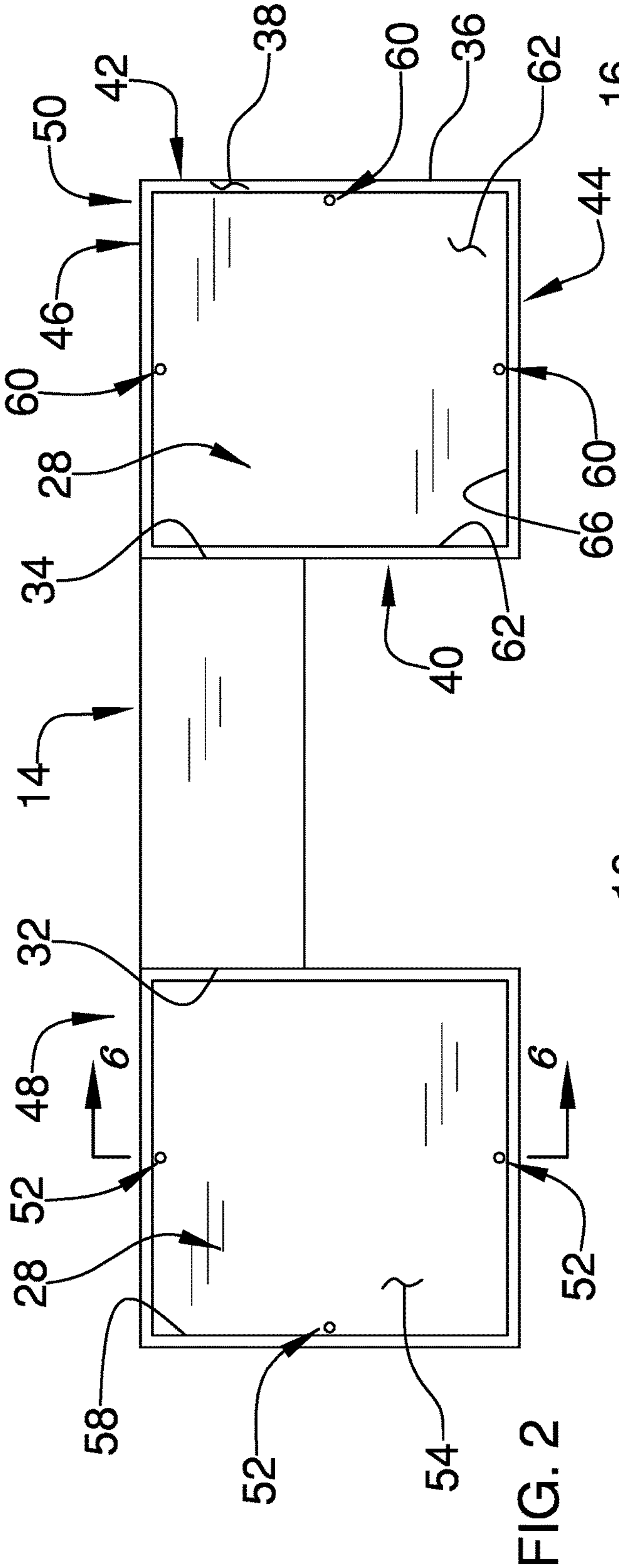
FIG. 2 is a top view of an embodiment of the disclosure.
Figure 3:
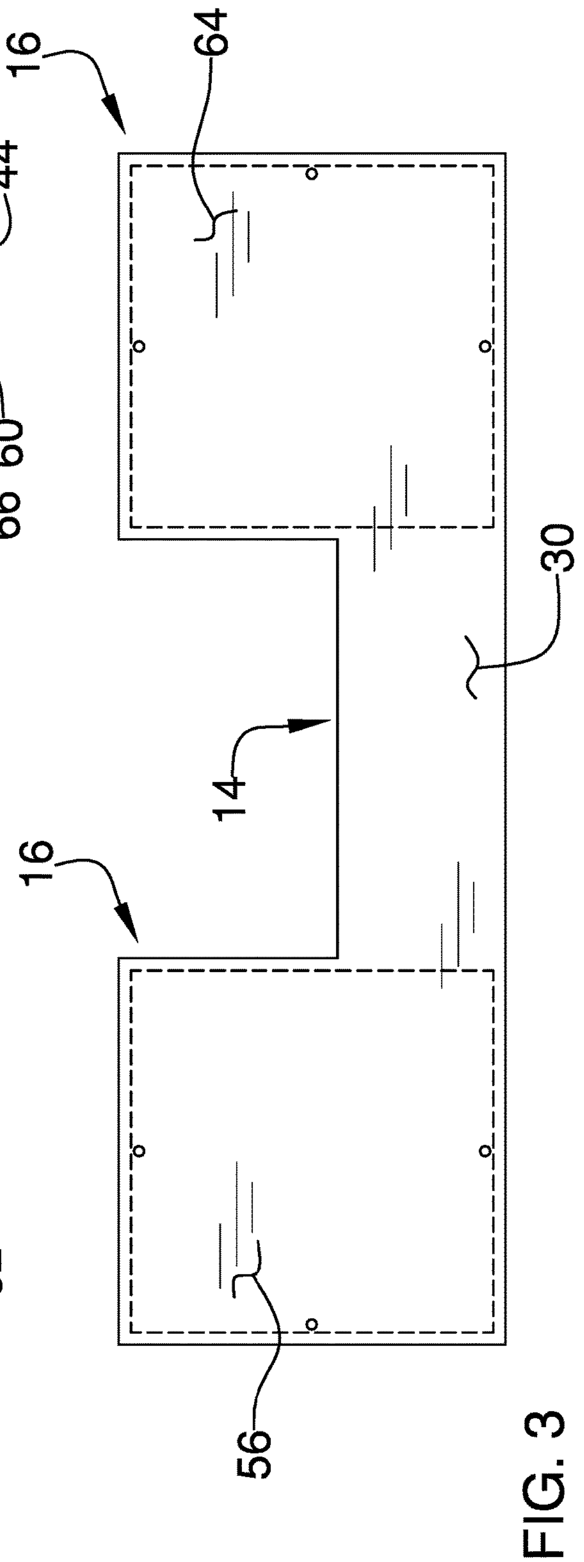
FIG. 3 is a bottom phantom view of an embodiment of the disclosure.
Figure 4:
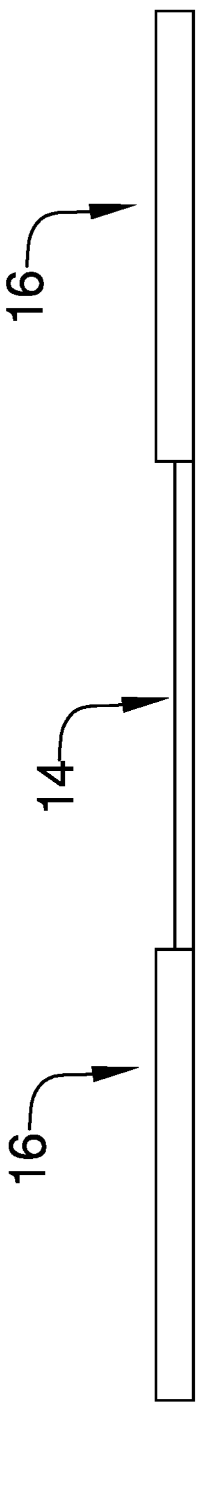
FIG. 4 is a front view of an embodiment of the disclosure.
Figure 5:
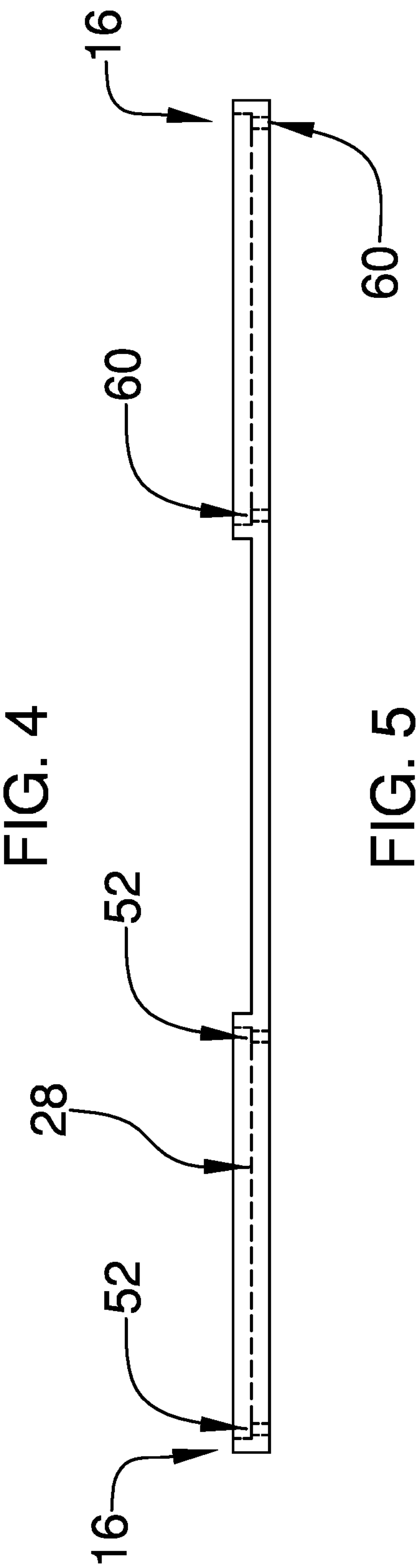
FIG. 5 is a back phantom view of an embodiment of the disclosure.
Figure 6:
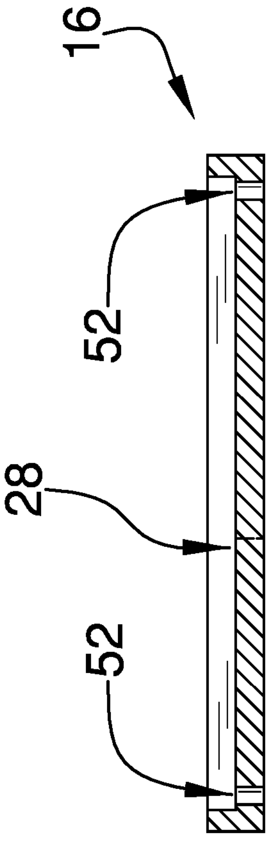
FIG. 6 is a cross sectional view taken along line 6-6 of FIG. 2 of an embodiment of the disclosure.

With reference now to the drawings, and in particular to FIGS. 1 through 8 thereof, a new ladder platform device embodying the principles and concepts of an embodiment of the disclosure and generally designated by the reference numeral 10 will be described.

As best illustrated in FIGS. 1 through 8, the ladder platform device 10 generally comprises a platform 12 that has a central panel 14 extending between a pair of outward panels 16. The central panel 14 is positionable upon a topmost step 18 of a ladder 20 such that each of the pair of outward panels 16 defines a work surface 22. In this way the work surface 22 defined on each of the pair of outward panels 16 can support tools 24 and other objects 26. The ladder 20 may be a step ladder, an extension ladder or any other type of ladder that is commonly employed for reaching elevated objects. Additionally, each of the pair of outward panels 16 has a recess 28 to retain the tools 24 and other objects 26 on the outward panels 16.

The central panel 14 has a lower surface 30 extending between a first end 32 and a second end 34 of the central panel 14 and the central panel 14 is elongated between the first end 32 and the second end 34. Each of the pair of outward panels 16 has a perimeter edge 36 and an upper surface 38 and the perimeter edge 36 of each of the pair of outward panels 16 has a first lateral side 40, a second lateral side 42, and front side 44 and a back side 46. The first end 32 of the central panel 14 is attached to the second lateral side 42 of the perimeter edge 36 of a first one of the pair of outward panels 48. The second end 34 of the central panel 14 is attached to the first lateral side 40 of the perimeter edge 36 of a second one of the pair of outward panels 50. Furthermore, the central panel 14 is aligned with the back side 46 of the perimeter edge 36 of each of the pair of outward panels 16.

The recess 28 associated with each of the pair of outward panels 16 extends downwardly into the upper surface 38 of the outward panels 16. The first outward panel 48 has a plurality of first holes 52 each extending through a bounding surface 54 of the recess 28 in the first outward panel 48 and a bottom surface 56 of the first outward panel 48. Each of the plurality of first holes 52 is positioned adjacent to a perimeter 58 of the recess 28 in the first outward panel 48. Additionally, each of the plurality of first holes 52 is aligned with a middle of a respective one of the front side 44 and the second lateral side 42 and the back side 46 of the perimeter edge 36 of the first outward panel 48.

The second outward panel 50 has a plurality of second holes 60 each extending through a bounding surface 62 of the recess 28 in the second outward panel 50 and a bottom surface 64 of the second outward panel 50. Each of the plurality of second holes 60 is positioned adjacent to a perimeter 66 of the recess 28 in the second outward panel 50. Each of the plurality of second holes 60 is aligned with a middle of a respective one of the front side 44 and the first lateral side 40 and the back side 46 of the perimeter edge 36 of the second outward panel 50.

A plurality of hooks 68 is provided and each of the plurality of hooks 68 is removably attachable to a respective one of the pair of outward panels 16 to suspend a respective tool 24 from the respective outward panel 16. Each of the plurality of hooks 68 has a first curve 72 and a second curve 74 which each curves in opposite directions from each other such that each of the plurality of hooks 68 has an S-shape. The first curve 72 of each of the plurality of hooks 68 is extendable through a respective one of the plurality of first holes 52 or the plurality of second holes 60. In this way the second curve 74 of each of the plurality of hooks 68 is spaced downwardly from a respective one of the pair of outward panels 16 to have the tool 24 suspended on the second curve 74. A pair of elastomeric bands 76 is provided and each of the pair of elastomeric bands 76 is positionable around the central panel 14 and the topmost step 18 of the ladder 20 thereby securing the platform 12 to the topmost step 18 of the ladder 20.

Figure 7:
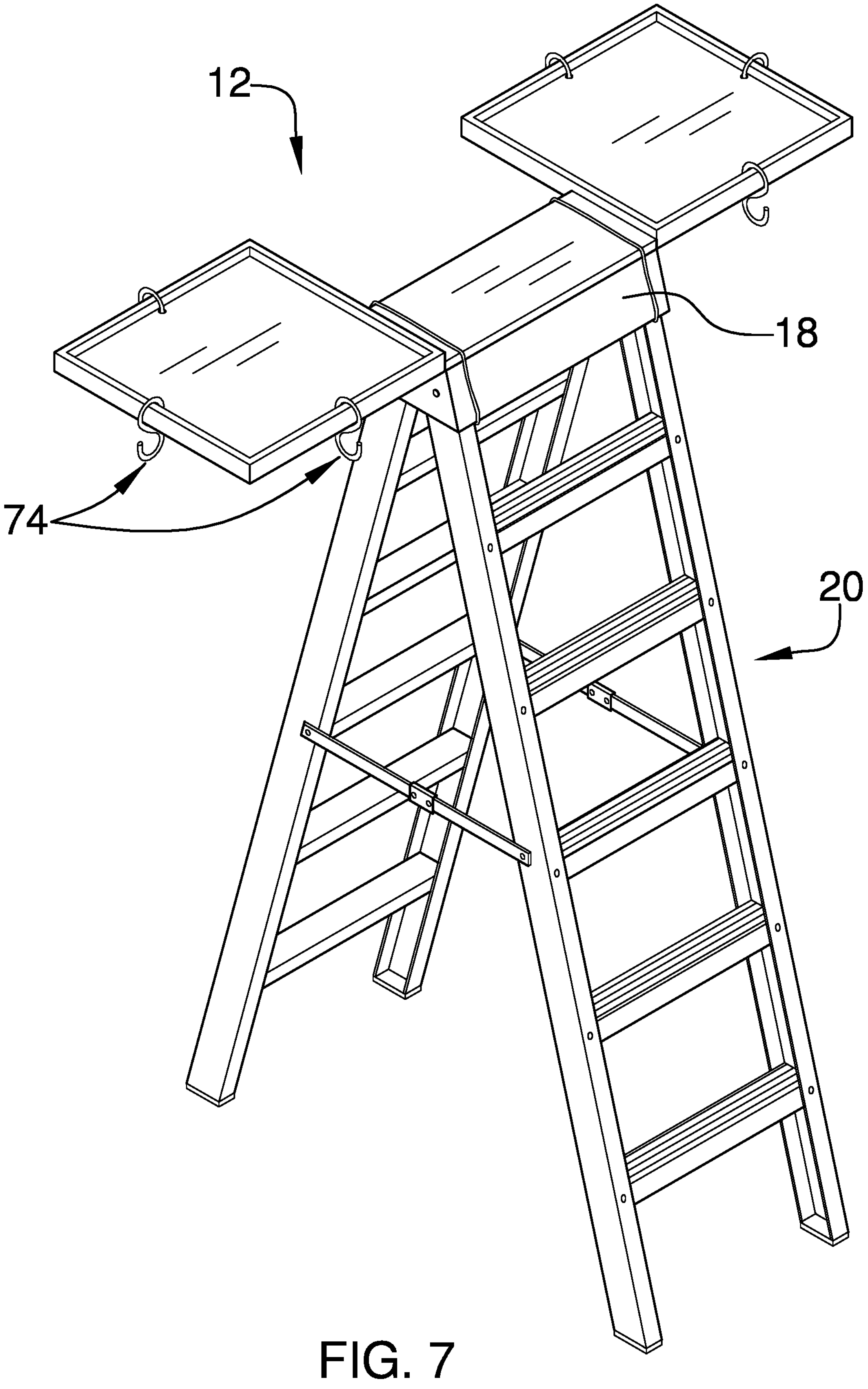
FIG. 7 is a perspective in-use view of an embodiment of the disclosure showing a platform mounted to a ladder in a first position.
Figure 8:
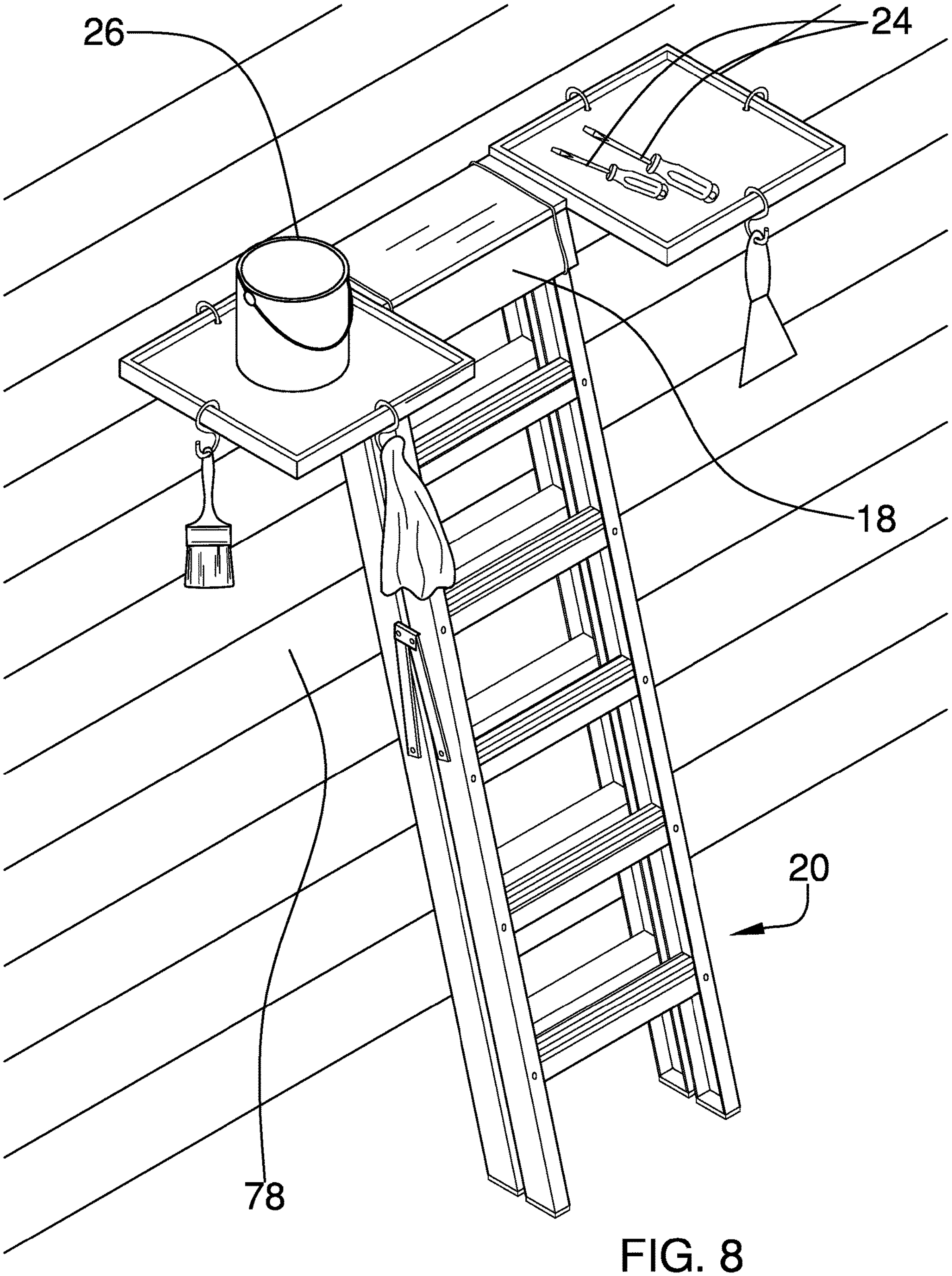
FIG. 8 is a perspective view of an embodiment of the disclosure showing a platform mounted to a ladder in a second position.

In use, lower surface 30 of the central panel 14 is laid upon the topmost step 18 of the ladder 20 and each of the pair of elastomeric bands 76 is positioned around the central panel 14 and the topmost step 18 to secure the platform 12 to the ladder 20. In this way tools 24 and other objects 26 can be stored in the recess 28 in each of the outward panels 16 while the ladder 20 is being employed. Furthermore, one or more of the plurality of hooks 68 can be attached to the platform 12 to facilitate power tools 24, for example, to be suspended from the hooks 68 for storage. In this way a wide variety of tools 24 and objects 26 can be stored on the outward panels 16 or suspended from the hooks 68 to ensure all of the tools 24 and objects 26 are readily accessible while the ladder 20 is being employed. As is seen in FIG. 7, the platform 12 can be oriented in a first position on the topmost step 18 such that each of the outward panels 16 extends rearwardly from the ladder 20. As is seen in FIG. 8, the platform 12 can be oriented in a second position on the topmost step 18 such that each of the outward panels 16 extends forwardly from the ladder 20 to facilitate the ladder 20 to be leaned against a wall 78.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ladder platform device being mountable to ladder to define a work platform on the ladder, said device comprising:

a platform having a central panel extending between a pair of outward panels, said central panel being positionable upon a topmost step of a ladder such that each of said pair of outward panels defines a work surface wherein said work surface defined on each of said pair of outward panels is configured to support tools and other objects, each of said pair of outward panels having a recess wherein said recess in each of said outward panels is configured to retain the tools and other objects on said outward panels;

a plurality of hooks, each of said plurality of hooks being removably attachable to a respective one of said pair of outward panels wherein each of said plurality of hooks is configured to suspend a tool from said respective outward panel;

wherein said central panel has a lower surface extending between a first end and a second end of said central panel, said central panel being elongated between said first end and said second end;

wherein each of said pair of outward panels has a perimeter edge and an upper surface, said perimeter edge of each of said pair of outward panels having a first lateral side and a second lateral side and front side and a back side;

wherein said first end of said central panel is attached to said second lateral side of said perimeter edge of a first one of said pair of outward panels;

wherein said second end of said central panel is attached to said first lateral side of said perimeter edge of a second one of said air of outward panels;

wherein said central panel is aligned with said back side of said perimeter edge of each of said pair of outward panels; and wherein said recess associated with each of said pair of outward panels extends downwardly into said top surface of said outward panels.

2. The assembly according to claim 1, wherein:

said first outward panel has a plurality of first holes each extending through a bounding surface of said recess in said first outward panel and a bottom surface of said first outward panel;

each of said plurality of first holes is positioned adjacent to a perimeter of said recess in said first outward panel; and each of said plurality of first holes is aligned with a middle of a respective one of said front side and said second lateral side and said back side of said perimeter edge of said first outward panel.

3. The assembly according to clarin 2, wherein:

said second outward panel has a plurality of second holes each extending through a bounding surface of said recess in said second outward panel and a bottom surface of said second outward panel;

each of said plurality of second holes is positioned adjacent to a perimeter of said recess in said second outward panel; and each of said plurality of second holes is aligned with a middle of a respective one of said front side and said first lateral side and said back side of said perimeter edge of said second outward panel.

4. The assembly according to claim 3, wherein:

each of said plurality of hooks has a first curve and a second curve each curving in opposite directions from each other such that each of said plurality of hooks has an S-shape; and said first curve of each of said plurality of hooks being extendable through a respective one of said plurality of first holes or said plurality of second holes having said second curve of each of said plurality of hooks being spaced downwardly from a respective one of said pair of outward panels wherein said second curve of each of said plurality of hooks is configured to have the tool suspended thereon.

5. The assembly according to claim 1, further comprising a pair of elastomeric bands, each of said pair of electromeric bands being positionable around said central panel and said topmost step of said ladder thereby securing said platform to said topmost step of said ladder.

6. A ladder platform device being mountable to ladder to define a work platform on the ladder, said device comprising:

a platform having a central panel extending between a pair of outward panels, said central panel being positionable upon a topmost step of a ladder such that each of said pair of outward panels defines a work surface wherein said work surface defined on each of said pair of outward panels is configured to support tools and other objects, each of said pair of outward panels having a recess wherein said recess in each of said outward panels is configured to retain the tools and other objects on said outward panels, said central panel having a lower surface extending between a first end and a second end of said central panel, said central panel being elongated between said first end and said second end, each of said pair of outward panels having a perimeter edge and an upper surface, said perimeter edge of each of said pair of outward panels having a first lateral side and a second lateral side and front side and a back side, said first end of said central panel being attached to said second lateral side of said perimeter edge of a first one of said pair of outward panels, said second end of said central panel being attached to said first lateral side of said perimeter edge of a second one of said pair of outward panels, said central panel being aligned with said back side of said perimeter edge of each of said pair of outward panels, said recess associated with each of said pair of outward panels extending downwardly into said top surface of said outward panels, said first outward panel having a plurality of first holes each extending through a bounding surface of said recess in said first outward panel and a bottom surface of said first outward panel, each of said plurality of first holes being positioned adjacent to a perimeter of said recess in said first outward panel, each of said plurality of first holes being aligned with a middle of a respective one of said front side and said second lateral side and said back side of said perimeter edge of said first outward panel, said second outward panel having a plurality of second holes each extending through a bounding surface of said recess in said second outward panel and a bottom surface of said second outward panel, each of said plurality of second holes being positioned adjacent to a perimeter of said recess in said second outward panel, each of said plurality of second holes being aligned with a middle of a respective one of said front side and said first lateral side and said back side of said perimeter edge of said second outward panel;

a plurality of hooks, each of said plurality of hooks being removably attachable to a respective one of said pair of outward panels wherein each of said plurality of hooks is configured to suspend a tool from said respective outward panel, each of said plurality of hooks having a first curve and a second curve each curving in opposite directions from each other such that each of said plurality of hooks has an S-shape, said first curve of each of said plurality of hooks being extendable through a respective one of said plurality of first holes or said plurality of second holes having said second curve of each of said plurality of hooks being spaced downwardly from a respective one of said pair of outward panels wherein said second curve of each of said plurality of hooks is configured to have the tool suspended thereon; and a pair of elastomeric bands, each of said pair of elastomeric bands being positionable around said central panel and said topmost step of said ladder thereby securing said platform to said topmost step of said ladder.

* * * * *